(No Model.) 2 Sheets—Sheet 2.
P. LINSCHEID.
BAND CUTTER AND FEEDER.
No. 519,722. Patented May 15, 1894.
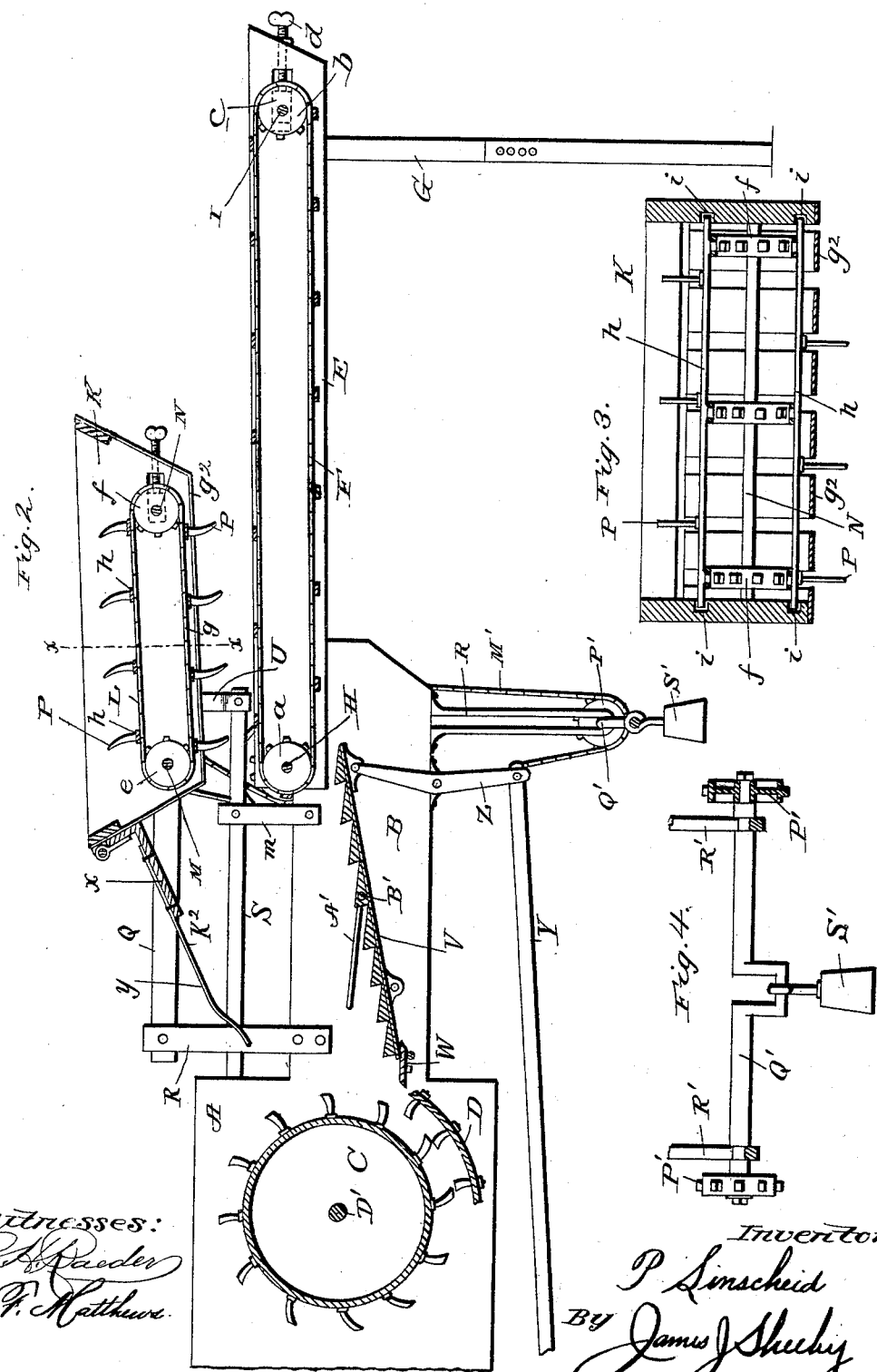

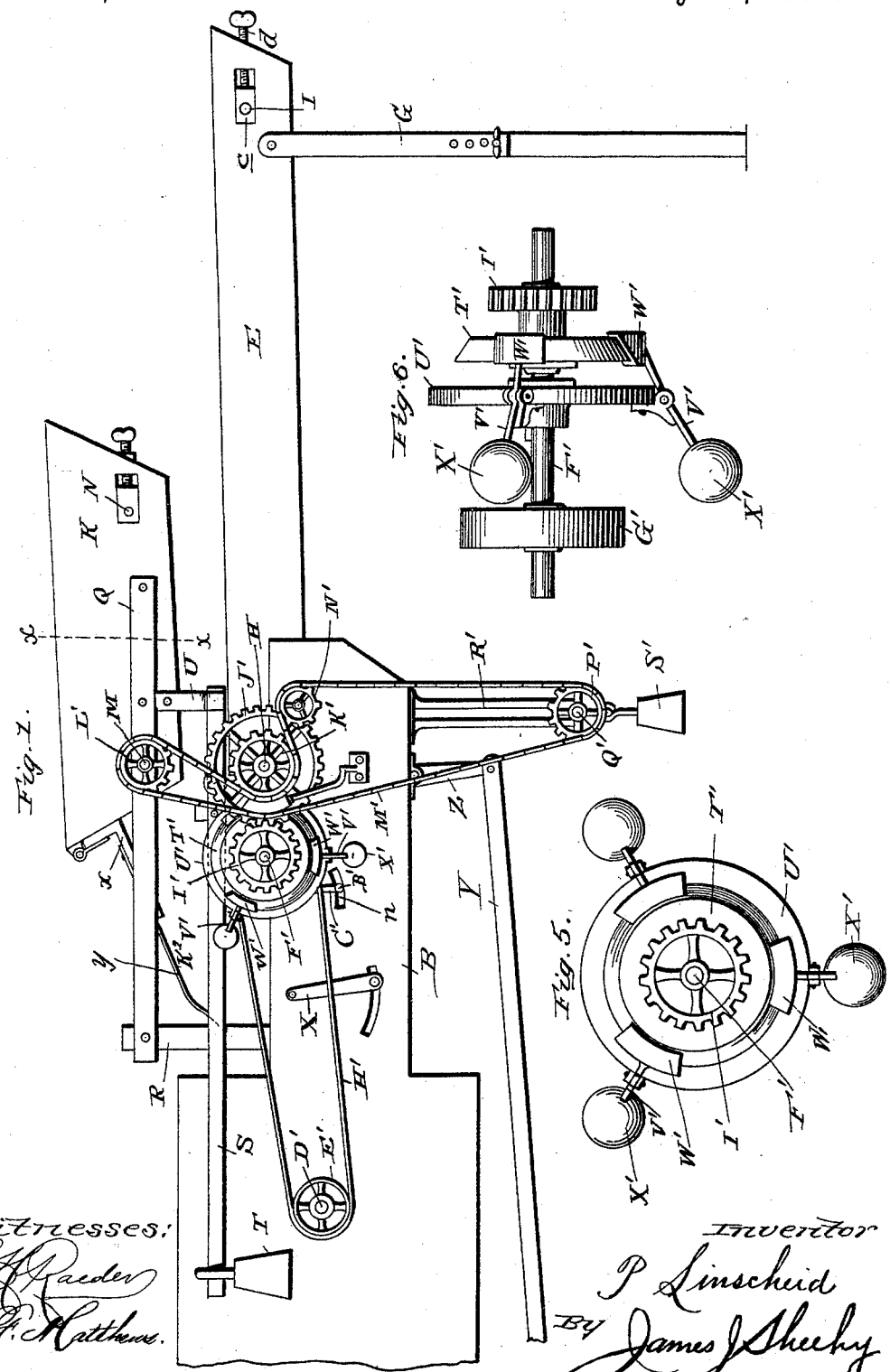

UNITED STATES PATENT OFFICE.

PETER LINSCHEID, OF KEMI, MINNESOTA.

BAND-CUTTER AND FEEDER.

SPECIFICATION forming part of Letters Patent No. 519,722, dated May 15, 1894.

Application filed January 5, 1894. Serial No. 495,846. (No model.)

*To all whom it may concern:*

Be it known that I, PETER LINSCHEID, a citizen of the United States, residing at Kemi, in the county of Cottonwood and State of Minnesota, have invented certain new and useful Improvements in Band-Cutters and Feeders; and I do declare the following to be a full, clear, and exact description of the invention, such as will enable others skilled in the art to which it appertains to make and use the same.

My invention relates to improvements in band cutters and feeders, and it has for its general object to provide a simple, compact and highly efficient band cutter and feeder adapted to form a permanent part of a thrashing machine, and one embodying such a construction that it may be compactly folded upon the thrashing machine, when not in use, and conveniently transported from place to place therewith.

Another object of the invention is to provide a band cutter and feeder embodying an automatic feed governor; the said governor being designed and adapted to prevent overfeeding and consequent choking of the thrashing machine.

Other objects and advantages of the invention will be fully understood from the following description and claims when taken in connection with the annexed drawings, in which—

Figure 1, is a side elevation of my improved band cutter and feeder, together with a portion of a thrashing machine. Fig. 2, is a vertical longitudinal section of the same. Fig. 3, is an enlarged detail, transverse section taken in the plane indicated by the lines *x*, *x*, of Figs. 1, and 2. Fig. 4, is a detail, front elevation, partly in section, of the mechanism for automatically taking up the slack in the chains driving the knife carrying belt or apron. Fig. 5, is a front elevation of the automatic, feed governing mechanism, and Fig. 6, is a side elevation of the same.

Referring by letter to said drawings:—A, indicates the casing of a thrashing machine, which is provided with the rearwardly extended side bars B, and incloses the ordinary toothed cylinder C, and concave D; and E, indicates the frame of the endless carrier F, of my improvements. This frame E, has its rear end supported by the adjustable legs G; and its forward end is arranged between the side bars B, of the casing A, as better shown in Fig. 2, and is loosely mounted upon a transverse shaft H, journaled in the bars B, whereby it will be seen that when not in use the frame and the carrier thereof may be swung up on the casing A. The endless carrier F, of the frame E, takes around sprocket wheels $a$, on the shaft H, and sprocket wheels $b$, on the shaft I, which shaft I, is journaled in slide blocks $c$, which are designed to be adjusted by the screws $d$, so as to take up any slack of the carrier.

K, indicates a frame which normally rests above the forward portion of the frame E, and is provided at its bottom with slats $g^2$; and L, indicates the endless belt which takes around the sprocket wheels $e, f$, on the transverse shafts M, N, journaled in said frame K, as shown. This belt L, comprises the chains $g$, and the transverse slats $h$; and these slats $h$, which carry the band cutting knives P, are designed to travel in the kerfs or grooves $i$, in the side bars of the frame K, which kerfs or grooves are provided in order to prevent tipping or rocking of the slats when their knives engage the grain.

$K^2$, indicates a frame which is designed and adapted to hold the grain down upon the feed table, when it is *en route* to the thrashing cylinder. This frame $K^2$, preferably comprises an angular body $x$, which is hinged to the frame K, and the fingers $y$, which are connected to and extend forwardly from the body, and it is designed and adapted to be swung back into the frame K, when the same is swung over upon the casing A, as will be presently described.

In order that the frame K, may be swung over upon the casing A, when not in use, I connect it to arms Q, which are pivotally connected to standards R, rising from the side bars B, as shown; and in order to enable the said frame K, to move vertically when a large body of grain comes between the belt L, and carrier F, it is supported on the rear ends of levers S, which are fulcrumed at intermediate points of their length upon standards $m$, and are provided at or adjacent to their forward ends with weights T, as shown. The rear ends of the levers S, rest in the bifurcations of forks U, depending from the frame K, as illustrated; and consequently it will be perceived that the said levers will not interfere with the frame K, being swung up and over upon the machine casing. The said levers S, and the standards m, are arranged upon opposite sides of the path of movement of the frame E, and they therefore will not interfere with the said frame being raised as before described.

V, indicates a reciprocatory feed table which is arranged between the side bars B, and beneath and in advance of the forward end of the carrier F, as illustrated. This feed table bears at its forward end upon a shoe or rest W, and is supported and guided in its movements by the swinging arms X, and it is actuated from the drive shaft or other part of the mechanism of the thrashing machine through the medium of the pitman Y, and the rocking bar Z, which bar is connected to the pitman and to the table, as shown. The said feed table V, is designed and adapted to facilitate the passage of the grain to the cylinder C, and concave D; and in order to spread and even the grain *en route* so that it will not take between the cylinder and concave in a tangled mass, I provide the table V, with the oscillating fingers A', which are arranged a suitable distance apart and are carried by a rock shaft B', which is journaled in the table and extends through curvilinear slots n, in the casing bars B, as shown. This rock shaft B', is connected at its ends to cranks C', which are actuated through the medium of the mechanism illustrated, and consequently it will be seen that when the table V, is reciprocated, the fingers A', will be raised and lowered to even up the grain, as before stated.

D', indicates the shaft of the cylinder C, of the thrashing machine, which is provided with a pulley as E'.

F', indicates the drive shaft of the band cutter and feeder which is provided with a fixed pulley as G', and H', indicates the belt which takes around the pulleys E', and G', and transmits motion from the shaft D', to the shaft F'. Motion is transmitted from the shaft F', to the shaft H, through the medium of the meshing gear wheels I' and J', and motion is transmitted from the shaft H, to the shaft M, through the medium of the sprocket wheels K', on the shaft H, the sprocket wheels L', on the shaft M, and the sprocket chains M', which take around said wheels K', and L', as shown. These sprocket chains M', also take around idler sprocket wheels N', arranged adjacent to the wheels K', and around the sprocket wheels P', which are loosely mounted on the shaft Q', arranged to move in the guides R'. This movable shaft Q', is provided with a weight S', and it is designed to move vertically in concert with the frame K, so as to accommodate the chains M', to the positions of said frame.

In order to automatically regulate the feed so as to prevent choking of the thrashing machine, I provide the friction clutch mechanism better illustrated in Figs. 5, and 6. This mechanism comprises the wheel T', which is fixedly connected to the gear wheel I', and is loosely mounted on the shaft F', the wheel U', which is fixed on the shaft F', and the centrifugal levers V', which are fulcrumed upon the wheel U', and are provided at their inner ends with shoes W', designed to engage the periphery of the wheel T', and at their outer ends with weights X'. The operation of this part of my invention is as follows: When but a normal amount of grain is passing between the cylinder C, and concave D, the cylinder will be rotated by its driving mechanism at a high rate of speed, as will also the shaft F', and consequently the weighted ends of the levers V', will be thrown outward by centrifugal action and the shoes at the inner ends of said levers will be forced against the periphery of the wheel T', so as to cause said wheel to turn with its shaft and transmit motion to the shafts H, and M, through the medium of the gearing described. When, however, an abnormal amount of grain takes between the cylinder C, and concave D, the friction incident to the passage of the same will reduce the speed of rotation of the cylinder and consequently that of the shaft F', and the centrifugal action being insufficient to hold the weighted ends of the levers V', out, the inner ends of said levers will be disengaged from the wheel T', and the carrier F, and belt L, will be stopped until the amount of grain is reduced to the normal and the cylinder again attains a speed sufficient to bind the levers V', against the wheel T'.

In the practice of the invention, it will be seen that by reason of the automatic feed governing mechanism and the peculiar construction disclosed, it is simply necessary for the operator to deposit the bundles or sheaves of grain upon the endless carrier, the machine serving to cut the bands and properly conduct the grain to the thrashing cylinder.

I prefer in practice to embody my improvements in a band cutter and feeder forming a permanent part of a thrashing machine as herein disclosed, but I do not desire to be understood as confining myself to such construction as the invention may, if desired, be embodied in that class of band cutters and feeders which are separate from but are designed to be used in conjunction with thrashing machines. I also do not desire to be understood as confining myself to the specific construction and relative arrangement of parts herein disclosed, as such changes or modifications may be made in practice as fairly fall within the scope of the invention.

Having described my invention, what I claim is—

1. In a band cutter and feeder, the combination of the frame or casing of a thrashing machine, a carrier, levers S, fulcrumed at an intermediate point of their length and carrying weights at one end, a frame K, bearing upon the opposite ends of the levers and carrying a band cutter and arms Q, connected to the frame K, and pivotally connected with the thrashing machine frame or casing, substantially as specified.

2. In a band cutter and feeder, the combination with the frame or casing of a thrashing machine; of a frame E, pivotally connected to said frame or casing and supporting an endless carrier, levers S, fulcrumed at an intermediate point of their length and carrying weights at one end, a frame K, bearing upon the opposite ends of the levers and carrying a band cutter, and arms Q, connected to the frame K, and pivotally connected to standards rising from the casing or frame of the thrashing machine, substantially as and for the purpose set forth.

3. In a band cutter and feeder, the combination of a carrier, levers S, fulcrumed at an intermediate point of their length and carrying weights at one end, a movable frame bearing upon the opposite ends of the levers and carrying a band cutter having a shaft provided with a wheel L', a shaft H, carrying a wheel K', an idler wheel N' a vertically movable, weighted shaft carrying a wheel P', and a belt engaging the wheels L', K', N', and P', all substantially as and for the purpose set forth.

4. In a band cutter and feeder, the combination with the toothed cylinder and concave of a thrashing machine; of an endless carrier a frame K arranged above the endless carrier and supporting a band cutter, the frame $K^2$, pivotally connected to the frame K, and comprising the body $x$, of approximate right angle form in cross section and the fingers extending forwardly from said body, and the feed table arranged beneath and in advance of the endless carrier, all substantially as and for the purpose set forth.

In testimony whereof I affix my signature in presence of two witnesses.

PETER LINSCHEID.

Witnesses:
J. L. GESSELL,
HENRY MÜLLER.